(12) United States Patent
Yi et al.

(10) Patent No.: US 10,764,870 B2
(45) Date of Patent: Sep. 1, 2020

(54) METHOD FOR TRANSMITTING UPLINK DATA IN A DUAL CONNECTIVITY AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/028,929

(22) PCT Filed: Sep. 19, 2014

(86) PCT No.: PCT/KR2014/008740
§ 371 (c)(1),
(2) Date: Apr. 12, 2016

(87) PCT Pub. No.: WO2015/060544
PCT Pub. Date: Apr. 30, 2015

(65) Prior Publication Data
US 2016/0255619 A1    Sep. 1, 2016

Related U.S. Application Data

(60) Provisional application No. 61/893,840, filed on Oct. 21, 2013.

(51) Int. Cl.
*H04W 72/04*    (2009.01)
*H04W 76/15*    (2018.01)
(Continued)

(52) U.S. Cl.
CPC ....... *H04W 72/0413* (2013.01); *H04W 24/08* (2013.01); *H04W 24/10* (2013.01); *H04W 76/15* (2018.02); *H04W 88/06* (2013.01)

(58) Field of Classification Search
CPC ... H04W 76/025; H04W 24/08; H04W 24/10; H04W 88/06; H04W 72/0413; H04W 76/15
See application file for complete search history.

(56) References Cited

U.S. PATENT DOCUMENTS

2010/0067489 A1* 3/2010 Pelletier ................ H04W 48/17
370/331
2012/0314618 A1    12/2012 Ben-Houidi et al.
(Continued)

FOREIGN PATENT DOCUMENTS

CN        103119989    5/2013
JP        2015514346    5/2015
(Continued)

OTHER PUBLICATIONS

European Patent Office Application Serial No. 14854917.3, Search Report dated May 12, 2017, 10 pages.
(Continued)

*Primary Examiner* — Jianye Wu
(74) *Attorney, Agent, or Firm* — Lee Hong Degerman Kang Waimey

(57) ABSTRACT

The present invention relates to a wireless communication system. More specifically, the present invention relates to a method and a device for transmitting uplink data in the wireless communication system, the method comprising: configuring a radio bearer comprising a first and a second Radio Link Controls (RLCs) and a first and a second Medium Access Controls (MACs) of the UE, wherein the first RLC and the first MAC are used to transmit data to the first BS, and the second RLC and the second MAC are used to transmit data to the second BS; receiving an indication for the radio bearer, wherein the indication indicates to which of the first BS and the second BS the radio bearer is to transmit data; and transmitting uplink (UL) data of the radio bearer
(Continued)

to the first BS using the first RLC and the first MAC if the indication indicates the radio bearer transmits data to the first BS.

8 Claims, 10 Drawing Sheets

(51) Int. Cl.
*H04W 24/08* (2009.01)
*H04W 24/10* (2009.01)
*H04W 88/06* (2009.01)

(56) References Cited

U.S. PATENT DOCUMENTS

| | | | |
|---|---|---|---|
| 2012/0314648 A1 | 12/2012 | Zhang et al. | |
| 2014/0301362 A1* | 10/2014 | Koskinen | H04L 1/1838 370/331 |
| 2014/0321263 A1* | 10/2014 | Wu | H04W 76/19 370/216 |
| 2015/0373767 A1* | 12/2015 | Park | H04W 76/025 370/329 |
| 2016/0066241 A1* | 3/2016 | Wu | H04W 36/28 370/331 |

FOREIGN PATENT DOCUMENTS

| | | |
|---|---|---|
| JP | 2016532327 | 10/2016 |
| WO | 2013139308 | 9/2013 |
| WO | 2015045268 | 4/2015 |

OTHER PUBLICATIONS

Intel Corporation, "Impacts of Splitting a Single EPS Bearer between Two (or more) eNBs", R2-131529, 3GPP TSG RAN WG2 Meeting #81bis, Apr. 2013, 10 pages.
Ericsson, "Impact of small cell enhancements to RRC functions", R2-131672, 3GPP TSG RAN WG2 Meeting #82, May 2013, 6 pages.
NTT DOCOMO, Inc., "Discussion on U-plane architecture for dual connectivity", R2-130324, 3GPP TSG RAN WG2 Meeting #81, Feb. 2013, 6 pages.
LG Electronics Inc., "Restricting UL PDCP data transmission to one eNB", R2-140744, 3GPP TSG RAN WG2 Meeting #85, Feb. 2014, 2 pages.
LG Electronics Inc., "Need for restricting UL transmission to one eNB", R2-134026, 3GPP TSG RAN WG2 Meeting #84, Nov. 2013, 3 pages.
Huawei, "UE complexity on the supported number of carriers, eNBs, and protocol entities", R2-133575, 3GPP TSG RAN WG2 Meeting #83bis, Oct. 2013, 4 pages.
Blackberry UK Limited, "U-plan Architecture Alternatives for RRC Message Transmission", R2-133334, 3GPP TSG RAN WG2 Meeting #83bis, Oct. 2013, 6 pages.
Catt, "Some consideration on functional allocation", R2-133373, 3GPP TSG RAN WG2 Meeting #83bis, Oct. 2013, 4 pages.
LG Electronics Inc., "BSR Impacts by Bearer Split," 3GPP TSG-RAN2 #83, R2-132583, Aug. 2013, 4 pages.
3rd Generation Partnership Project (3GPP), "Technical Specification Group Radio Access Network; Evolved Universal Terrestrial Radio Access (E-UTRA); Study on Small Cell Enhancements for E-UTRA and E-UTRAN—Higher Layer Aspects (Release 12)," 3GPP TR 36.842 V0.3.0, Aug. 2013, 51 pages.
Renesas Mobile Europe, "On Protocol Stack Impacts of Dual Connectivity," 3GPP TSG-RAN WG2 #83, R2-132405, Aug. 2013, 6 pages.
LG Electronics Inc., "Throughput Enhancement by Bearer Splitting for Dual Connectivity," 3GPP TSG-RAN2 #83, R2-132555, Aug. 2013, 3 pages.
PCT International Application No. PCT/KR2014/008740, Written Opinion of the International Searching Authority dated Dec. 24, 2014, 12 pages.
State Intellectual Property Office of the People's Republic of China Application Serial No. 201480057967.1, Office Action dated Jul. 3, 2018, 12 pages.
Blackberry UK, "U-plan Architecture Alternatives for RRC Message Transmission", 3GPP TSG RAN WG2 Meeting #83bis, R2-133334, Oct. 2013, 6 pages.
Panasonic, "Layer 2 transport of SRBs using User Plane Architecture options", R2-133307, 3GPP TSG-RAN WG2 Meeting #83-bis, Oct. 2013, 3 pages.
European Patent Office Application Serial No. 148549173, Office Action dated Feb. 6, 2019, 9 pages.
Renesas Mobile, "Discussion about dual connectivity", 3GPP TSG RAN WG2 Meeting #81, R2-130657, XP050668457, Feb. 2013, 4 pages.
3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), 3GPP TR 36.842 V0.1.1, May 2013, 38 pages.
3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), 3GPP TR 36.842 V0.3.1, Oct. 2013, 52 pages.
Nokia Siemens Networks (Rapporteur), "Email Discussion Report on U-Plane Alternatives [81bis#19]", 3GPP TSG-RAN WG2 Meeting #82, R2-131621, May 2013, 41 pages.

* cited by examiner (a) Control-Plane Protocol Stack (b) User-Plane Protocol Stack Component carrier ( a ) C-Plane connectivity of eNBs involved in dual connectivity (b) U-Plane connectivity of eNBs involved in dual connectivity

METHOD FOR TRANSMITTING UPLINK DATA IN A DUAL CONNECTIVITY AND A DEVICE THEREFOR

CROSS-REFERENCE TO RELATED APPLICATIONS

This application is the National Stage filing under 35 U.S.C. 371 of International Application No. PCT/KR2014/008740, filed on Sep. 19, 2014, which claims the benefit of U.S. Provisional Application No. 61/893,840, filed on Oct. 21, 2013, the contents of which are all hereby incorporated by reference herein in their entirety.

TECHNICAL FIELD

The present invention relates to a wireless communication system and, more particularly, to a method for transmitting uplink data in a dual connectivity and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for a method for transmitting uplink data in a dual connectivity. The technical problems solved by the present invention are not limited to the above technical problems and those skilled in the art may understand other technical problems from the following description.

Technical Solution

The object of the present invention can be achieved by providing a method for operating by an apparatus in wireless communication system, the method comprising; configuring a radio bearer comprising a first and a second Radio Link Controls (RLCs) and a first and a second Medium Access Controls (MACs) of the UE, wherein the first RLC and the first MAC are used to transmit data to the first BS, and the second RLC and the second MAC are used to transmit data to the second BS; receiving an indication for the radio bearer, wherein the indication indicates to which of the first BS and the second BS the radio bearer is to transmit data; and transmitting uplink (UL) data of the radio bearer to the first BS using the first RLC and the first MAC if the indication indicates the radio bearer transmits data to the first BS.

The object of the present invention can be achieved by providing a method for operating by an apparatus in wireless communication system, the method comprising; configuring a radio bearer comprising a first and a second Radio Link Controls (RLCs) and a first and a second Medium Access Controls (MACs) of the UE, wherein the first RLC and the first MAC are used to receive data from the first BS, and the second RLC and the second MAC are used to receive data from the second BS; receiving an indication for the radio bearer, wherein the indication indicates from which of the first BS and the second BS the radio bearer is to receive data; and receiving downlink (DL) data of the radio bearer from the first BS using the first RLC and the first MAC if the indication indicates the radio bearer receives data from the first BS.

In another aspect of the present invention provided herein is an apparatus in the wireless communication system, the apparatus comprising: an RF (radio frequency) module; and a processor configured to control the RF module, wherein the processor is configured to configure a radio bearer comprising a first and a second Radio Link Controls (RLCs) and a first and a second Medium Access Controls (MACs) of the UE, wherein the first RLC and the first MAC are used to transmit data to the first BS and the second RLC and the second MAC are used to transmit data to the second BS, to receive indication for the radio bearer, wherein the indication indicates to which of the first BS and the second BS the radio bearer is to transmit data, and to transmit uplink (UL) data of the radio bearer to the first BS using the first RLC and the first MAC if the indication indicates the radio bearer transmits data to the first BS.

Preferably, wherein the radio bearer is a signaling radio bearer (SRB).

Preferably, wherein the UL data is a Packet Data Convergence Protocol Service Data Unit (PDCP SDU).

Preferably, the method further comprises: measuring radio condition of a channel for the first BS and a channel for the second BS; and reporting a result of the measurement of the radio condition to at least one of the first BS and second BS.

Preferably, wherein the UL data of the radio bearer is not transmitted to the second BS if the indication indicates the radio bearer transmits data to the first BS.

Preferably, the method further comprising: receiving a second indication while the UL data of the radio bearer is transmitted to the first BS; and discarding all Service Data Units (SDUs) and Protocol Data Units (PDUs) stored in Packet Data Convergence Protocol (PDCP) if the second indication indicates the radio bearer transmits data to the second BS.

It is to be understood that both the foregoing general description and the following detailed description of the present invention are exemplary and explanatory and are intended to provide further explanation of the invention as claimed.

Advantageous Effects

According to the present invention, transmission of uplink data can be efficiently performed in a wireless communication system. Specifically, the UE can transmit the uplink data to one of base stations in dual connectivity system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
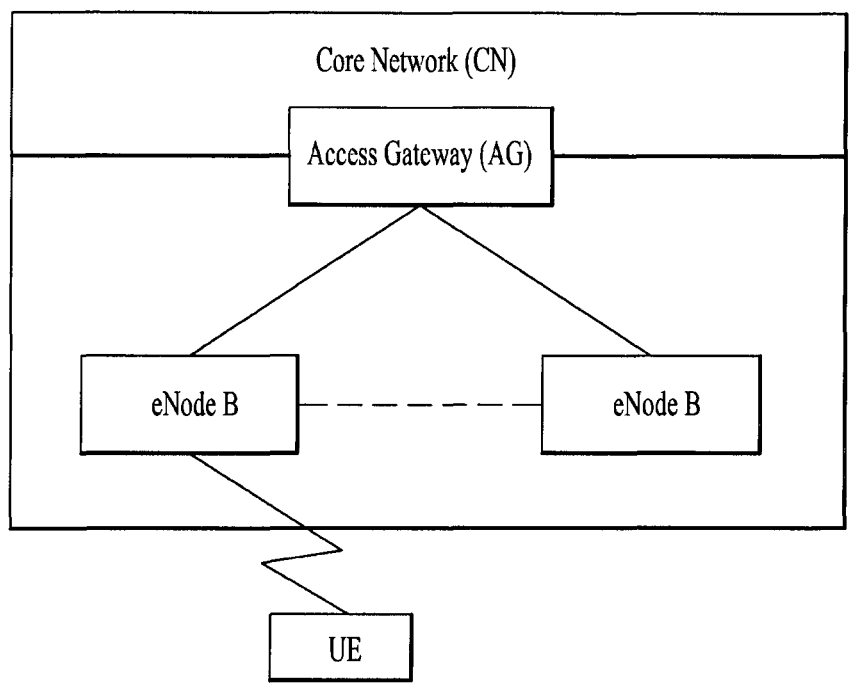
FIG. 1 is a diagram showing a network structure of an Evolved Universal Mobile Telecommunications System (E-UMTS) as an example of a wireless communication system.
Figure 2A:
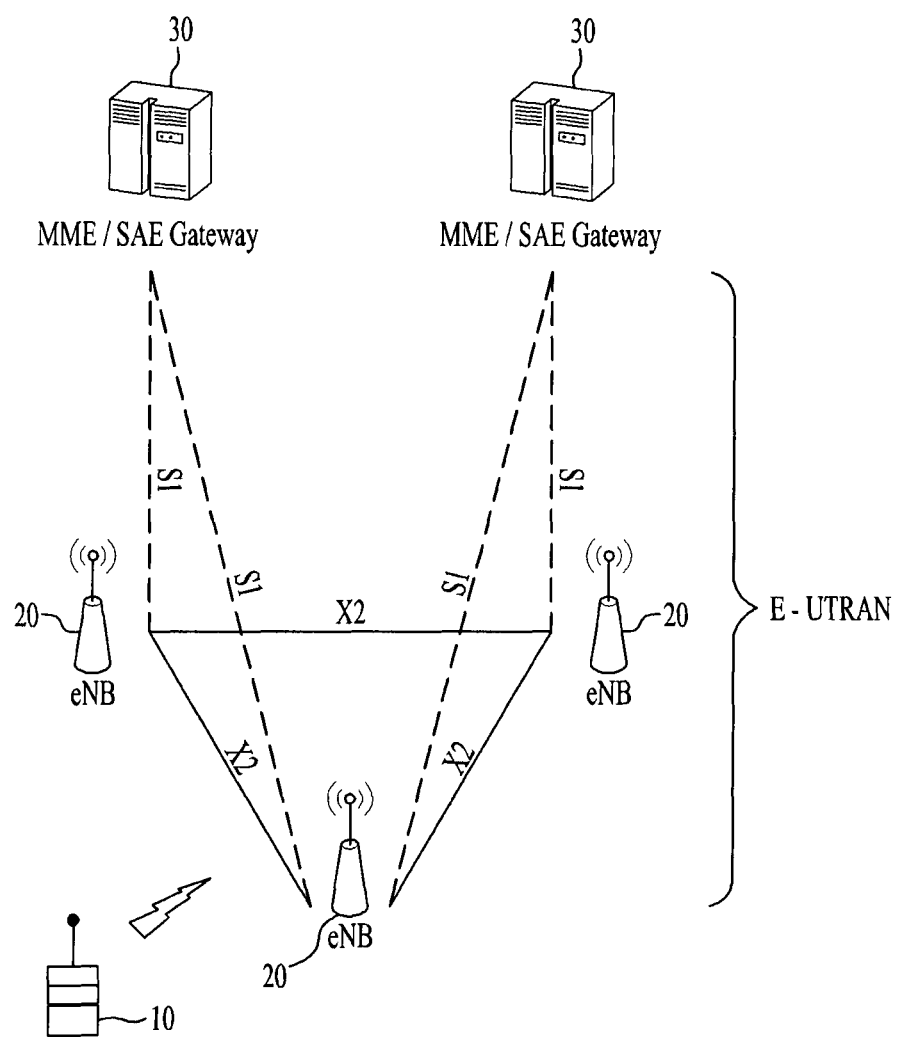
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
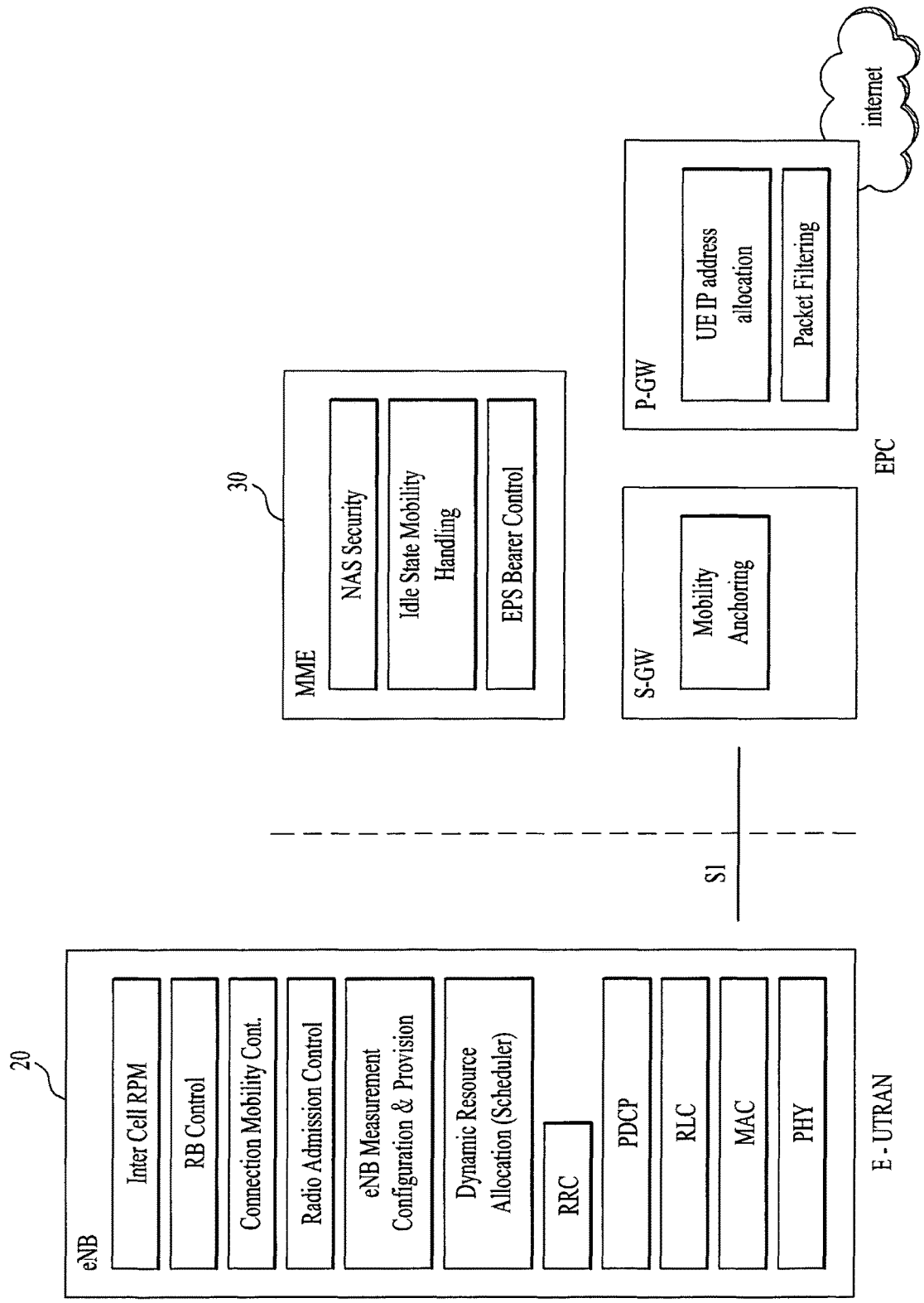
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
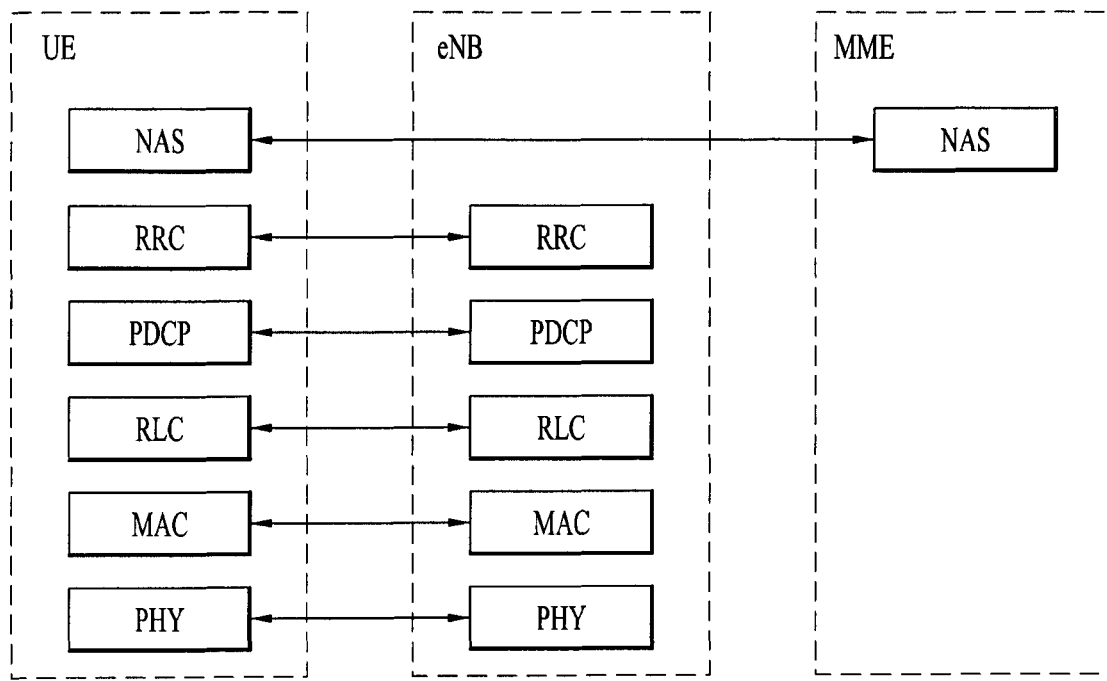
FIG. 3 is a diagram showing a control plane and a user plane of a radio interface protocol between a UE and an E-UTRAN based on a 3rd generation partnership project (3GPP) radio access network standard.
Figure 3:
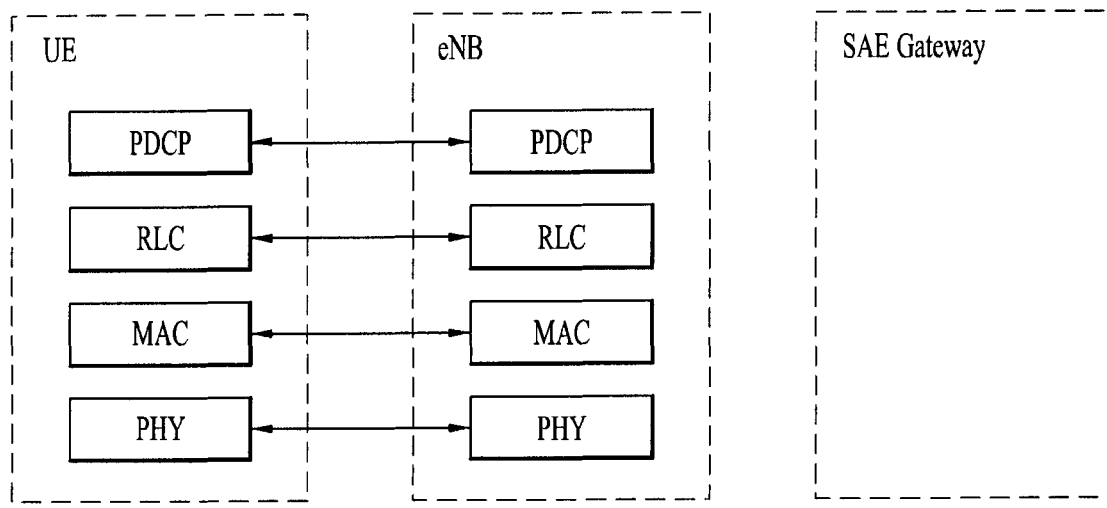

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
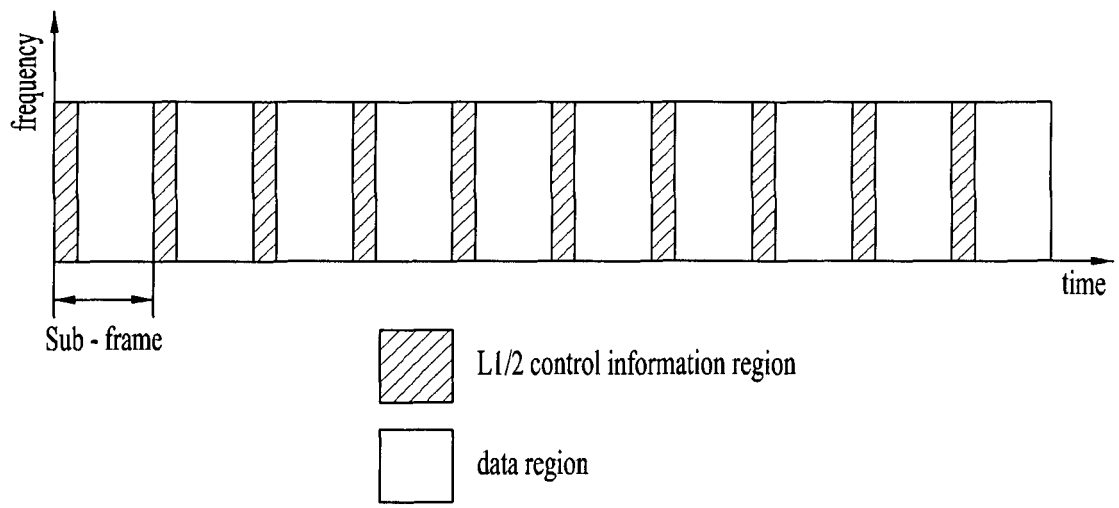
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
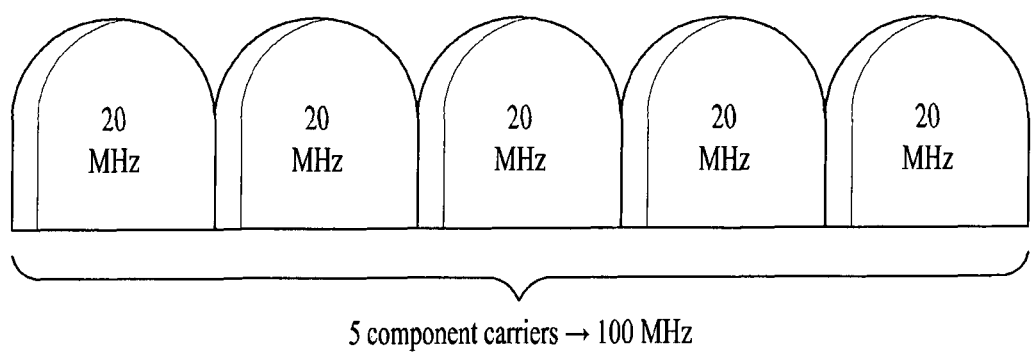
FIG. 5 is a diagram for carrier aggregation.

FIG. 5 is a diagram for carrier aggregation.

Carrier aggregation technology for supporting multiple carriers is described with reference to FIG. 5 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 6:
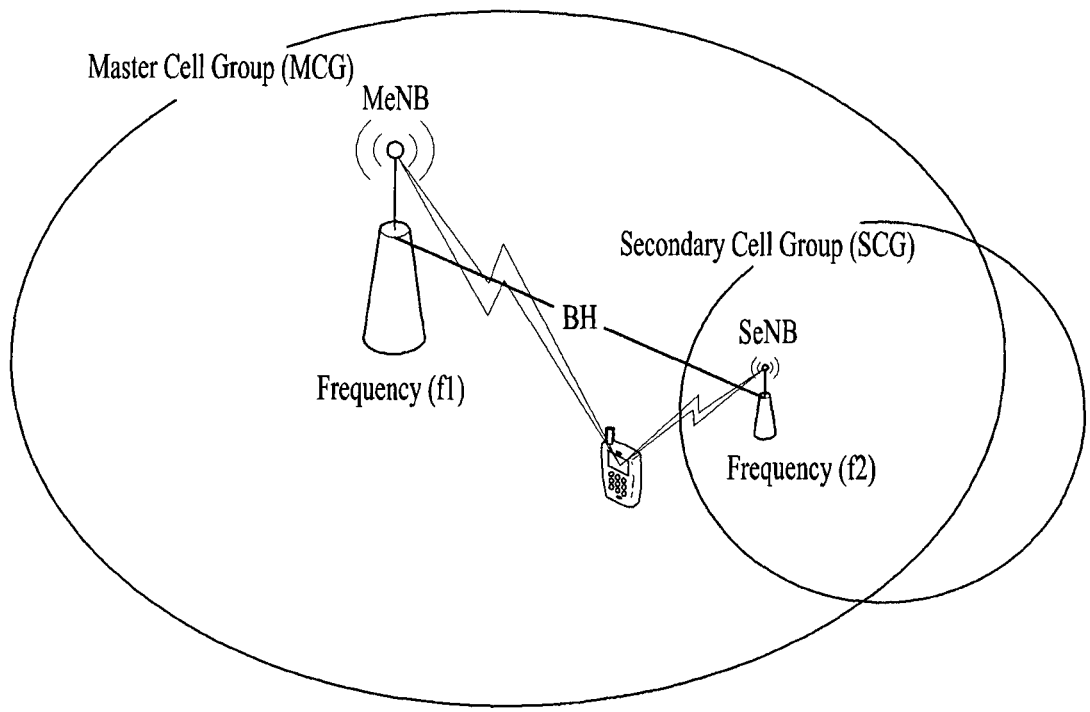
FIG. 6 is a conceptual diagram for dual connectivity between a Master Cell Group (MCG) and a Secondary Cell Group (SCG)

FIG. 6 is a conceptual diagram for dual connectivity (DC) between a Master Cell Group (MCG) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 7A:
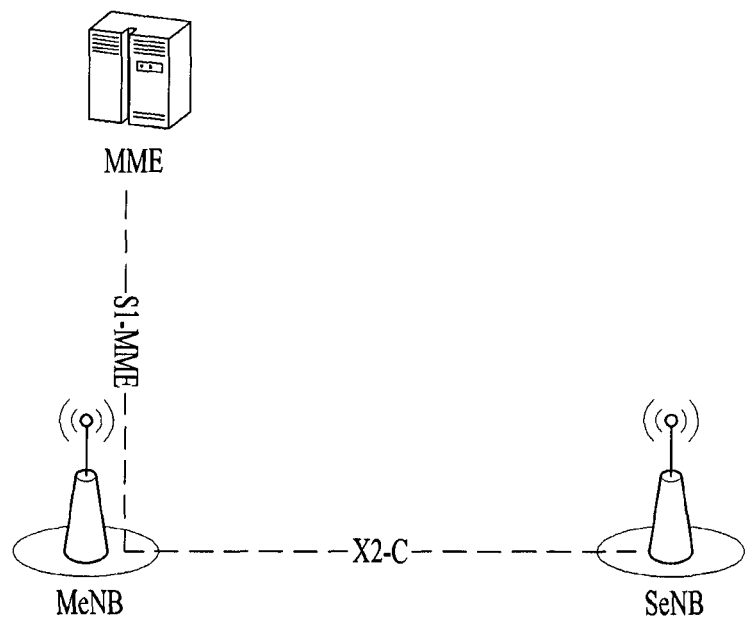
FIG. 7a is a conceptual diagram for C-Plane connectivity of base stations involved in dual connectivity.
Figure 7B:
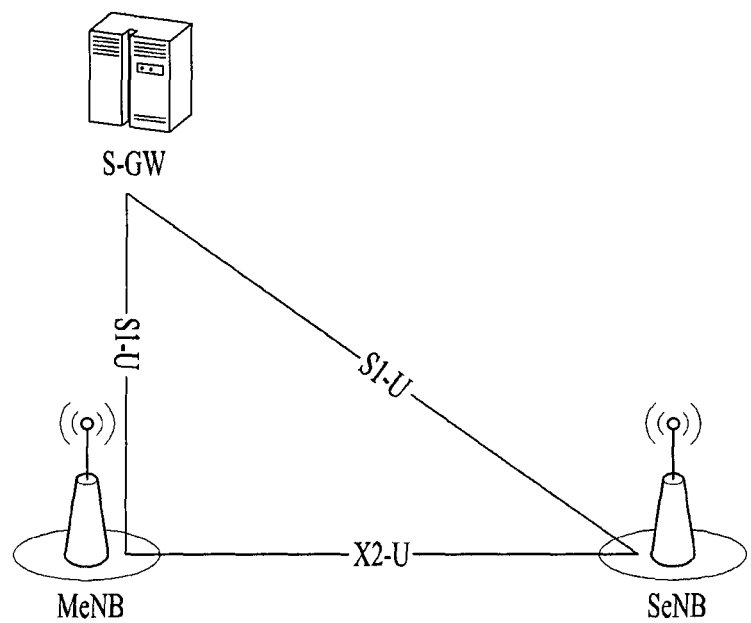
FIG. 7b is a conceptual diagram for U-Plane connectivity of base stations involved in dual connectivity.

FIG. 7a is a conceptual diagram for C-Plane connectivity of base stations involved in dual connectivity, and FIG. 7b is a conceptual diagram for U-Plane connectivity of base stations involved in dual connectivity.

FIG. 7a shows C-plane (Control Plane) connectivity of eNBs involved in dual connectivity for a certain UE. The MeNB is C-plane connected to the MME via S1-MME, the MeNB and the SeNB are interconnected via X2-C(X2-Control plane). As FIG. 7a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

FIG. 7b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 8:
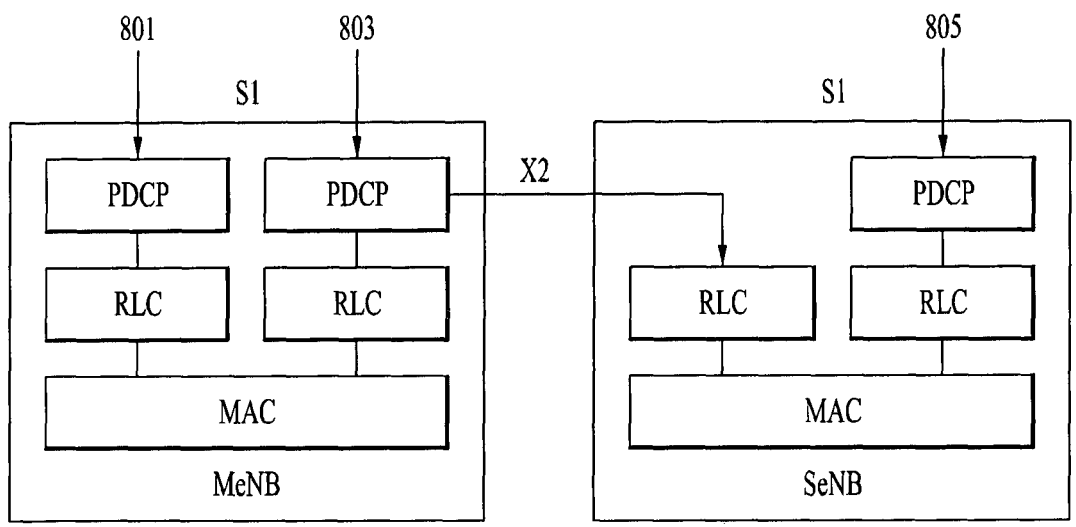
FIG. 8 is a conceptual diagram for radio protocol architecture for dual connectivity.

FIG. 8 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (801), split bearer (803) and SCG bearer (805). Those three alternatives are depicted on FIG. 8. The SRBs (Signaling Radio Bearers) are always of the MCG bearer and therefore only use the radio resources provided by the MeNB. The MCG bearer (801) is a radio protocol only located in the MeNB to use MeNB resources only in the dual connectivity. And the SCG bearer (805) is a radio protocol only located in the SeNB to use SeNB resources in the dual connectivity.

Specially, the split bearer (803) is a radio protocol located in both the MeNB and the SeNB to use both MeNB and SeNB resources in the dual connectivity and the split bearer (803) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

Figure 9:
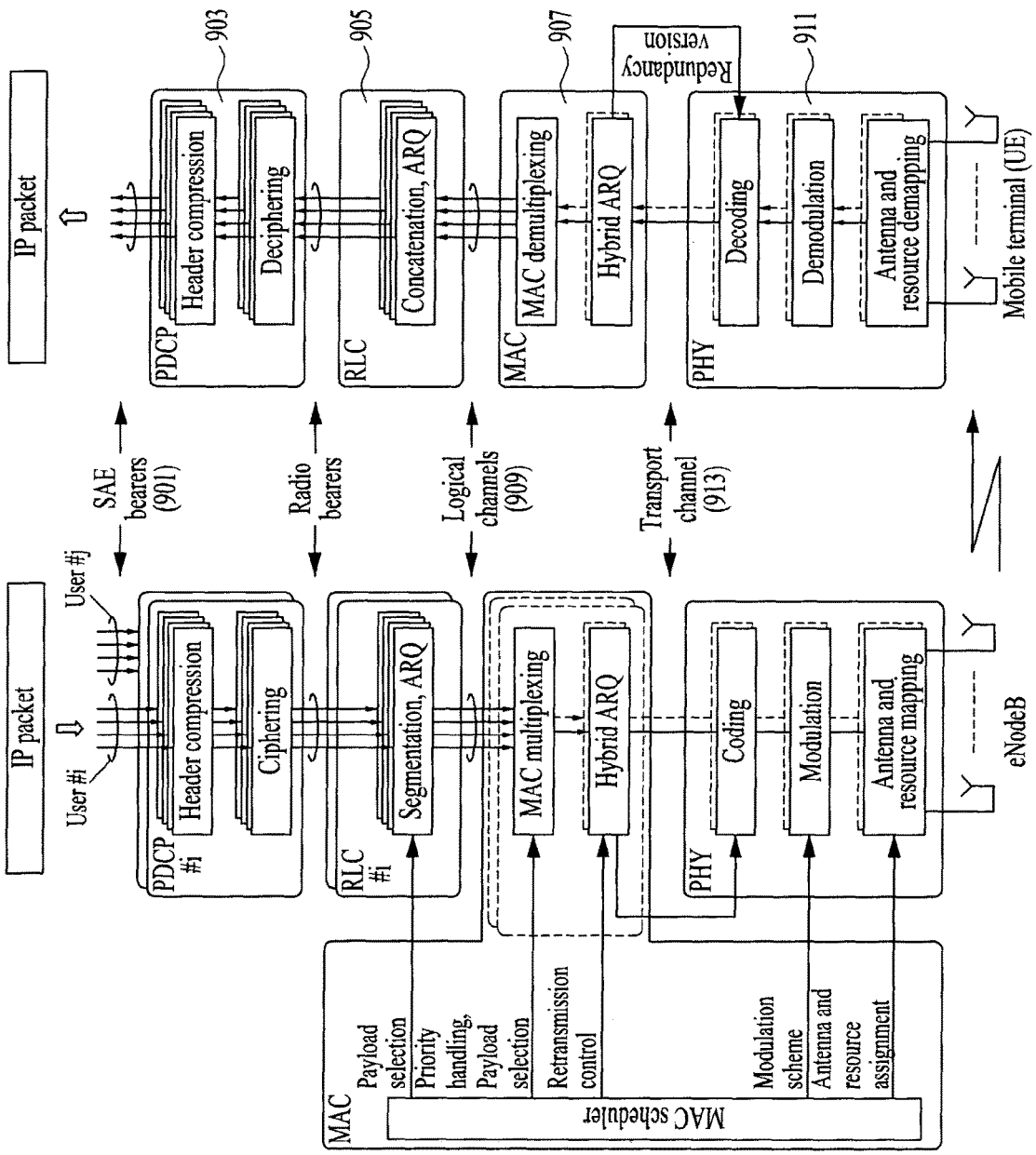
FIG. 9 is a diagram for a general overview of the LTE protocol architecture for the downlink.

FIG. 9 is a diagram for a general overview of the LTE protocol architecture for the downlink.

A general overview of the LTE protocol architecture for the downlink is illustrated in FIG. 9. Furthermore, the LTE protocol structure related to uplink transmissions is similar to the downlink structure in FIG. 9, although there are differences with respect to transport format selection and multi-antenna transmission.

Data to be transmitted in the downlink enters in the form of IP packets on one of the SAE bearers (901). Prior to transmission over the radio interface, incoming IP packets are passed through multiple protocol entities, summarized below and described in more detail in the following sections:

Packet Data Convergence Protocol (PDCP, 903) performs IP header compression to reduce the number of bits necessary to transmit over the radio interface. The header-compression mechanism is based on ROHC, a standardized header-compression algorithm used in WCDMA as well as several other mobile-communication standards. PDCP (903) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 905) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (905) offers services to the PDCP (903) in the form of radio bearers. There is one RLC entity per radio bearer configured for a terminal.

Medium Access Control (MAC, 907) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (907) offers services to the RLC (905) in the form of logical channels (909).

Physical Layer (PHY, 911), handles coding/decoding, modulation/demodulation, multi-antenna mapping, and other typical physical layer functions. The physical layer (911) offers services to the MAC layer (907) in the form of transport channels (913).

The MAC (907) offers services to the RLC (905) in the form of logical channels (909). A logical channel (909) is defined by the type of information it carries and are generally classified into control channels, used for transmission of control and configuration information necessary for operating an LTE system, and traffic channels, used for the user data.

Control-Plane Protocols

The control-plane protocols are, among other things, responsible for connection setup, mobility, and security. Control messages transmitted from the network to the terminals can originate either from the MME, located in the core network, or from the Radio Resource Control (RRC), located in the eNodeB.

NAS control-plane functionality, handled by the MME, includes EPS bearer management, authentication, security, and different idle-mode procedures such as paging. It is also responsible for assigning an IP address to a terminal. For a detailed discussion about the NAS control-plane functionality.

The RRC is located in the eNodeB and is responsible for handling the RAN-related procedures, including:

Broadcast of system information necessary for the terminal to be able to communicate with a cell.

Transmission of paging messages originating from the MME to notify the terminal about incoming connection requests. Paging is used in the RRC_IDLE state when the terminal is not connected to a particular cell. Indication of system-information update is another use of the paging mechanism, as is public warning systems.

Connection management, including setting up bearers and mobility within LTE. This includes establishing an RRC context—that is, configuring the parameters necessary for communication between the terminal and the radio-access network.

Mobility functions such as cell (re)selection.

Measurement configuration and reporting.

Handling of UE capabilities; when connection is established the terminal will announce its capabilities as all terminals are not capable of supporting all the functionality described in the LTE specifications.

RRC messages are transmitted to the terminal using signaling radio bearers (SRBs), using the same set of protocol layers (PDCP, RLC, MAC and PHY). The SRB is mapped to the common control channel (CCCH) during establishment of connection and, once a connection is established, to the dedicated control channel (DCCH). Control-plane and user-plane data can be multiplexed in the MAC layer and transmitted to the terminal in the same TTI. The aforementioned MAC control elements can also be used for control of radio resources in some specific cases where low latency is more important than ciphering, integrity protection, and reliable transfer.

Figure 10:
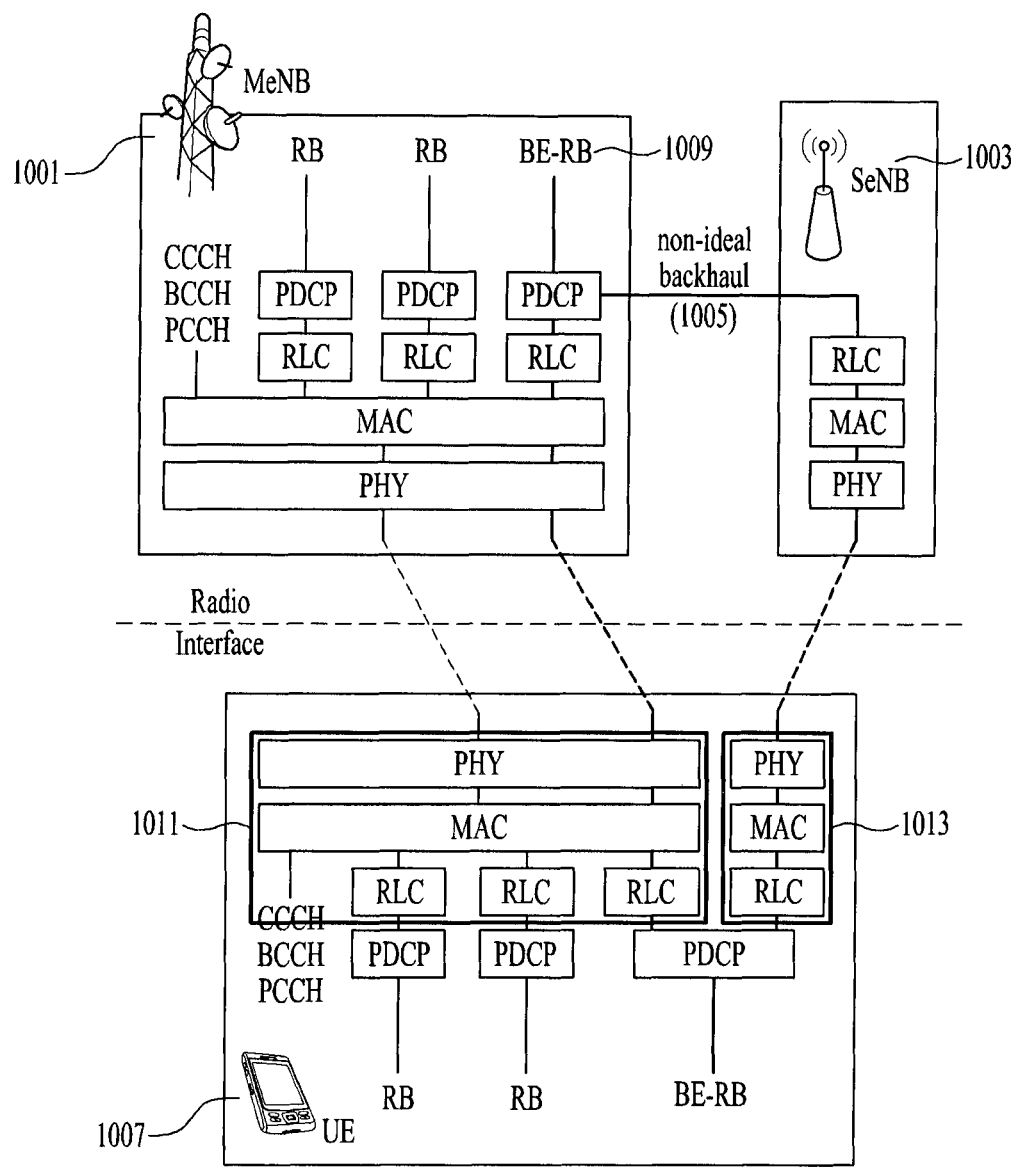
FIG. 10 is a conceptual diagram for one of radio protocol architecture for dual connectivity.

FIG. 10 is a conceptual diagram for one of radio protocol architecture for dual connectivity.

In LTE Rel-12, a new study on dual connectivity, i.e. UE is connected to both MeNB (1001) and SeNB (1003), as shown in FIG. 10. In this figure, the interface between MeNB (1001) and SeNB (1003) is called Xn interface (1005). The Xn interface (1005) is assumed to be non-ideal; i.e. the delay in Xn interface could be up to 60 ms, but it is not limited thereto.

To support dual connectivity, one of the potential solutions is for the UE (1007) to transmit data to both MeNB (1001) and SeNB (1003) utilizing a new RB structure called dual RLC/MAC scheme, where a single RB has one PDCP—two RLC—two MAC for one direction, and RLC/MAC pair is configured for each cell, as shown in FIG. 10. In this figure, BE-RB (1009) stands for RB for Best Effort traffic.

There is an attempt to transmit RBs using split bearer in order to increase the robustness of transmitted RRC messages or data units. If the RB transmits the RRC messages, the RB is a SRB and if the RB is transmits the data unit, the RB is a DRB. Both the MeNB and the SeNB prepare a set of RLC/MAC entities for RBs, and the PDCP in MeNB transmits the RRC message or data units to both sets of RLC/MAC entities. The UE also prepares two sets of RLC/MAC entities, one for MeNB and the other for SeNB.

In this scheme, RRC messages or data units are duplicated in PDCP and transmitted through both a $1^{st}$ route (1011) and a $2^{nd}$ route (1013). The $1^{st}$ route is used to transmit data toward the MeNB and the $2^{nd}$ route is used to transmit data toward the SeNB. Since the same message is transmitted from both eNBs, this scheme provides higher robustness, i.e. greatly increases the probability of UE's receiving RRC messages or data units.

However, the higher robustness does not come for free. Since the same data is transmitted from both eNBs, the signaling overhead is greatly increased. Moreover, depending on the UE location, one of the paths may be in bad radio condition, in which case the transmission on the radio resource in bad condition would be wasteful. In addition, PDCP protocol needs to be modified to support duplicate transmission in the transmitter and duplicate detection in the receiver.

Figure 11:
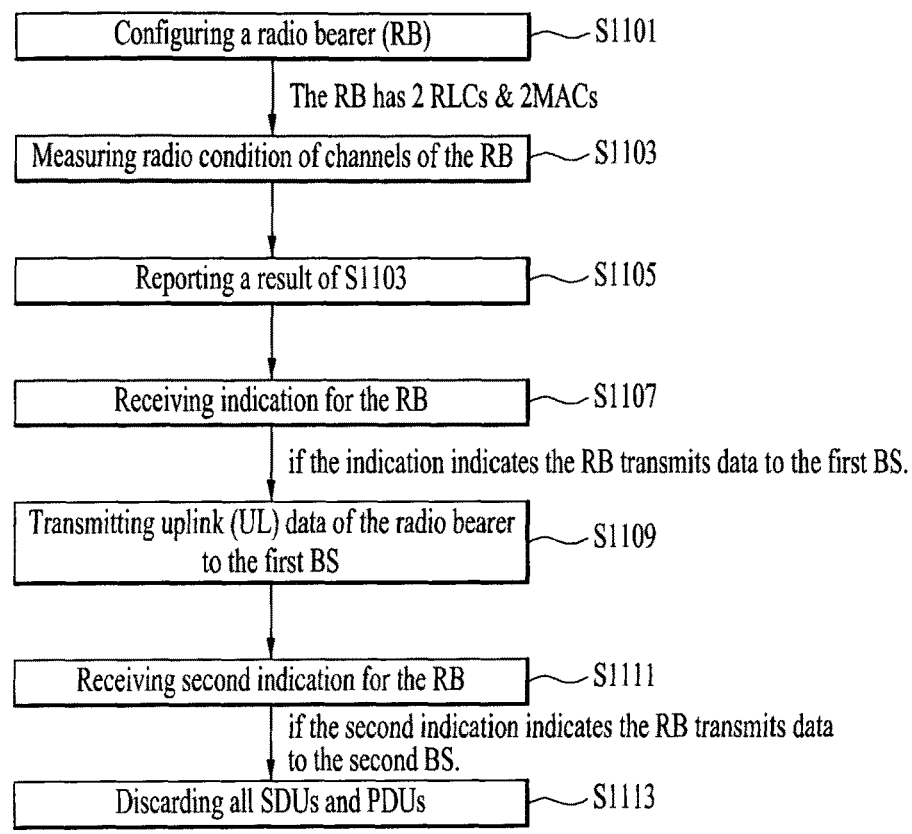
FIG. 11 is a conceptual diagram for transmitting uplink data in a dual connectivity according to embodiments of the present invention.

FIG. 11 is a conceptual diagram for transmitting uplink data according to embodiments of the present invention.

To overcome the problem with duplicate transmission, it is invented that the UE can determine to which base station the radio bearer transmits data.

The UE can configure a radio bearer comprising two Radio Link Controls (RLCs) and two Medium Access Controls (MACs) (S1101).

Preferably, the radio bearer may be a split bearer mentioned above. The split bearer is a radio protocol located in both the MeNB and the SeNB to use both MeNB and SeNB resources in the dual connectivity and the split bearer may be a radio bearer comprising one Packet Data Convergence Protocol (PDCP) entity, two Radio Link Control (RLC) entities and two Medium Access Control (MAC) entities for one direction.

Preferably, for the split bearer, a first RLC and a first MAC are used to transmit data to the first BS and a second RLC and a second MAC are used to transmit data to the second BS. The first BS may be a Master eNode-B (MeNB) and the second BS may be a Secondary eNode-B (SeNB), and vice versa.

A MCG (Master Cell Group) is a group of serving cells associated with the MeNB, comprising of a PCell and optionally one or more SCells. And a SCG (Secondary Cell Group) is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

For the split bearer, the functions of different MAC entities in the UE operate independently if not otherwise specified. Radio bearers are mapped to the MCG and the SCG with RRC signaling. The logical channel identities are allocated independently per CG. LCGs are defined per MAC entity.

The UE can measure radio condition of a channel for the first BS and a channel for the second BS (S1103).

Preferably, the radio condition of a channel comprises Radio Signal Reception Power (RSRP) of the channel, Radio Signal Code Power (RSCP) of the channel, Channel Qualification Information (CQI) of the channel.

Preferably, the channel for the first BS is a route used to transmit data to the first BS and the channel for the second BS is a route used to transmit data to the second BS.

After the step of S1103, the UE can report a result of the measurement of the radio condition to at least one of the first BS and second BS (S1105).

The UE can receive an indication for the radio bearer (S1107).

Preferably, the indication for the radio bearer may indicate to which base station the radio bearer transmits data.

Preferably, the indication for the radio bearer may be configured based on the reporting result of S1105.

Preferably, the indication is transmitted via RRC signaling, PDPC signaling, RLC signaling or MAC signaling.

Preferably, the indication for the radio bearer is transmitted via PDCP-Config message. The information element of PDCP-Config message is used to set the configurable PDCP parameters for data radio bearers. Table 1 is information elements of PDCP-Config message.

The field is relevant for split DRBs only, in which case absence of the field indicates that the UE shall send PDCP SDUs via MCG, but it is not limited thereto. In this case, the indication may be the field of "U1-Datapath".

The UE can transmit uplink data of the radio bearer to first BS using the first RLC and the first MAC if the indication indicates the radio bearer transmits data to the first BS (S1109). In this case, the UE cannot transmit the uplink data of the radio bearer to second BS. If the indication indicates the radio bearer transmits data to the second BS, the UE can transmit uplink data of the radio bearer to second BS using the second RLC and the second MAC. In this case, the UE cannot transmit the uplink data of the radio bearer to first BS.

On the other hand, in the step of S1109, if the indication is not received during the dual connectivity, the UE can transmit uplink data of the radio bearer to second BS using the second RLC and the second MAC. That is, only if the indication is received, the UE can transmit uplink data of the radio bearer to first BS, but it is not limited to.

Meanwhile, the UE can receive downlink data of the radio bearer from first BS using the first RLC and the first MAC if the indication indicates the radio bearer receives data from the first BS (S1109). In this case, the UE cannot receive the downlink data of the radio bearer to the second BS. If the indication indicates the radio bearer receives data from the second BS, the UE can receive downlink data of the radio bearer from second BS using the second RLC and the second

TABLE 1

PDCP-Config information element

```
-- ASN1START
PDCP-Config ::=              SEQUENCE {
    discardTimer                 ENUMERATED {
                                     ms50, ms100, ms150, ms300, ms500,
                                     ms750, ms1500, infinity
    }                                                    OPTIONAL,        -- Cond Setup
    rlc-AM                       SEQUENCE {
        statusReportRequired         BOOLEAN
    }                                                    OPTIONAL,        -- Cond Rlc-AM
    rlc-UM                       SEQUENCE {
        pdcp-SN-Size                 ENUMERATED {len7bits, len12bits}
    }                                                    OPTIONAL,        -- Cond Rlc-UM
    headerCompression            CHOICE {
        notUsed                      NULL,
        rohc                         SEQUENCE {
            maxCID                       INTEGER (1..16383)               DEFAULT 15,
            profiles                     SEQUENCE {
                profile0x0001                BOOLEAN,
                profile0x0002                BOOLEAN,
                profile0x0003                BOOLEAN,
                profile0x0004                BOOLEAN,
                profile0x0006                BOOLEAN,
                profile0x0101                BOOLEAN,
                profile0x0102                BOOLEAN,
                profile0x0103                BOOLEAN,
                profile0x0104                BOOLEAN
            },
            ...
        }
    },
    ...,
    [[ rn-IntegrityProtection-r10   ENUMERATED {enabled}    OPTIONAL    -- Cond RN
    ]],
    [[ pdcp-SN-Size-v1130           ENUMERATED {len15bits}  OPTIONAL    -- Cond Rlc-AM2
    ]],
    [[ ul-DataPath-r12              ENUMERATED {scg}        OPTIONAL    -- Need OP
    ]]
)
-- ASN1STOP
```

Specially, the field of "U1-Datapath" indicates whether or not the UE shall send UL data (e.g., PDCP SDUs) via SCG.

MAC. In this case, the UE cannot receive the downlink data of the radio bearer from first BS.

Preferably, the radio bearer may a signaling radio bearer (SRB). And the downlink data may be a RRC message.

After the step of S1109, if the UE receives second radio indication (S1111), when the indication indicates the radio bearer transmits data to the first BS and the second indication indicates the radio bearer transmits data to the second BS, the UE can discard all Service Data Units (SDUs) and Protocol Data Units (PDUs) stored in Packet Data Convergence Protocol (PDCP) entity.

Figure 12:
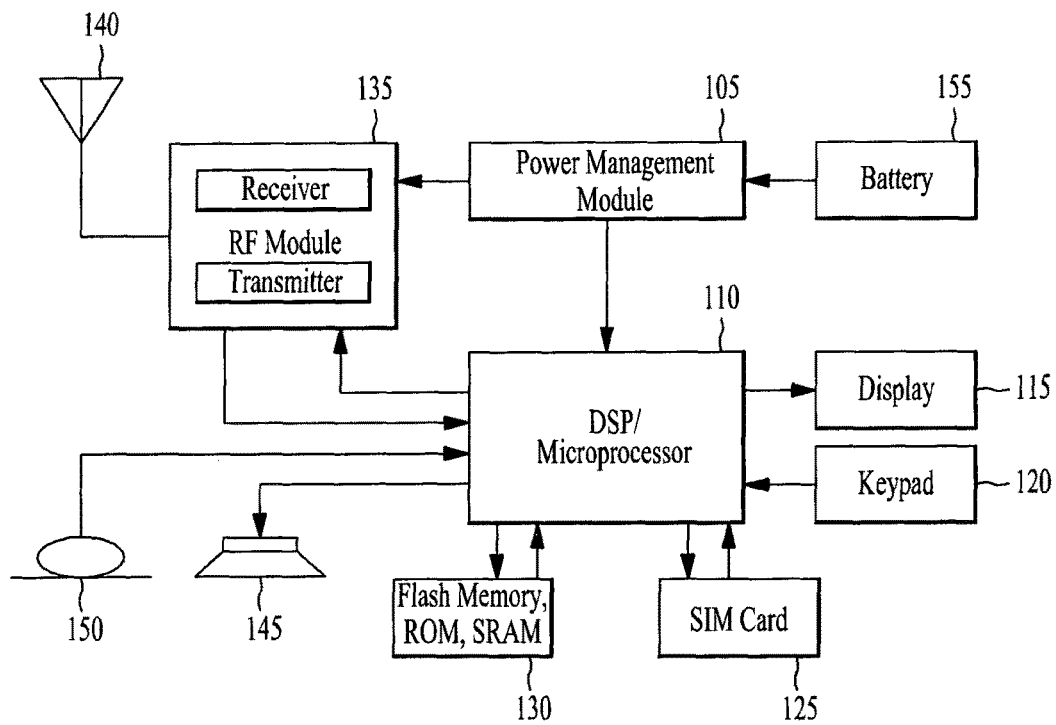
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) and/or eNB adapted to perform the above mechanism, but it can be any apparatus for performing the same operation.

As shown in FIG. 12, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 12 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 12 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a dual connectivity mode in a wireless communication system, the method comprising:
    configuring, by the UE, a split bearer associated with both
        a base station (BS) of a master cell group (MCG) and
        a BS of a secondary cell group (SCG),
    wherein the configuring the split bearer comprises configuring:
        a packet data convergence protocol (PDCP) entity of the UE,
        a first radio link control (RLC) entity and a first medium access control (MAC) entity of the UE, and
        a second RLC entity and a second MAC entity of the UE,
    wherein the PDCP entity is connected with both of the first RLC entity and the second RLC entity, the first RLC entity is connected with the first MAC entity, and the second RLC entity is connected with the second MAC entity, and
    wherein the first RLC entity and the first MAC entity are used to communicate with the BS of the MCG and the second RLC entity and the second MAC entity are used to communicate with the BS of the SCG;

while in the dual connectivity mode, receiving a Radio Resource Control (RRC) signal including an indication related to a transmission path; and based on the indication and while in the dual connectivity mode, transmitting, by the PDCP entity, the data of the PDCP entity of the UE only to the first RLC entity without duplication to the second RLC entity or only to the second RLC entity without duplication to the first RLC entity.

2. The method according to claim 1, wherein the data of the PDCP entity is a PDCP protocol data unit (PDU).

3. The method according to claim 1, further comprising:
measuring a radio condition of a channel for the BS of the MCG and a radio condition of a channel for the BS of the SCG; and
reporting a result of the measurement of the radio conditions to at least one of the BS of the MCG or the BS of the SCG.

4. The method of claim 1,
wherein the method further comprises:
receiving a second RRC signal including a second indication related to the transmission path; and
discarding all the data of the PDCP entity based on the second indication informing a transmission path different from a transmission path informed by the indication.

5. A user equipment (UE) operating in a dual connectivity mode in a wireless communication system, the UE comprising:
a radio frequency (RF) module including a transceiver; and
a processor configured to:
configure a split bearer associated with both a base station (BS) of master cell group (MCG) and a BS of secondary cell group (SCG),
wherein the configuring the split bearer comprises configuring:
a packet data convergence protocol (PDCP) entity of the UE,
a first radio link control (RLC) entity and a first medium access control (MAC) entity of the UE, and
a second RLC entity and a second MAC entity of the UE,
wherein the PDCP entity is connected with both of the first RLC entity and the second RLC entity, the first RLC entity is connected with the first MAC entity, and the second RLC entity is connected with the second MAC entity, and
wherein the first RLC entity and the first MAC entity are used to communicate with the BS of the MCG and the second RLC entity and the second MAC entity are used to communicate with the BS of the SCG;
while in the dual connectivity mode, receive a Radio Resource Control (RRC) signal including an indication related to a transmission path; and
based on the indication and while in the dual connectivity mode, transmitting, by the PDCP entity, the data of the PDCP entity of the UE only to the first RLC entity without duplication to the second RLC entity or only to the second RLC entity without duplication to the first RLC entity.

6. The UE according to claim 5, wherein the data of the PDCP entity is a PDCP protocol data unit (PDU).

7. The UE according to claim 5, wherein the processor is further configured to:
measure a radio condition of a channel for the BS of the MCG and a radio condition of a channel for the BS of the SCG; and
report a result of the measurement of the radio conditions to at least one of the BS of the MCG or the BS of the SCG.

8. The UE of claim 5, wherein the processor is further configured to:
receive a second RRC signal including a second indication related to the transmission path, and
discard all the data of the PDCP entity based on the second indication informing a transmission path different from a transmission path informed by the indication.

* * * * *